April 7, 1936.  A. E. MORRIS  2,036,953
RELEASE MECHANISM
Filed May 21, 1935
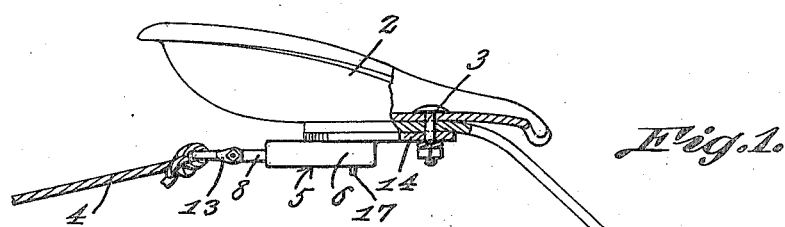
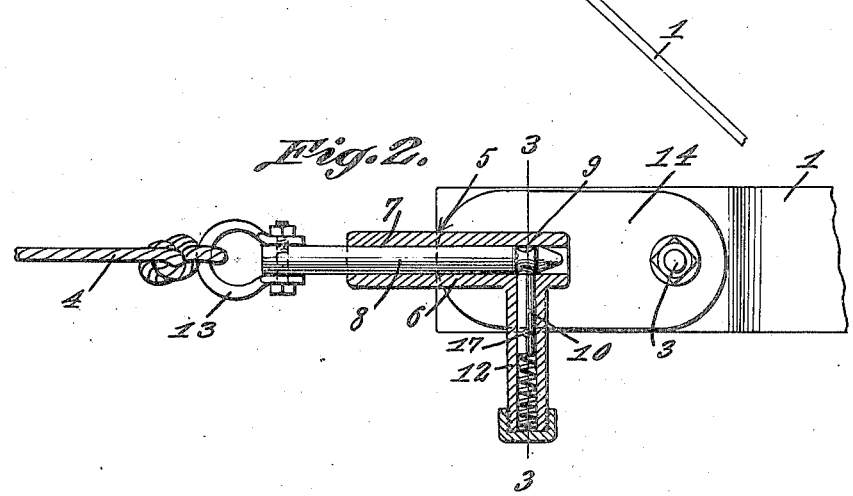
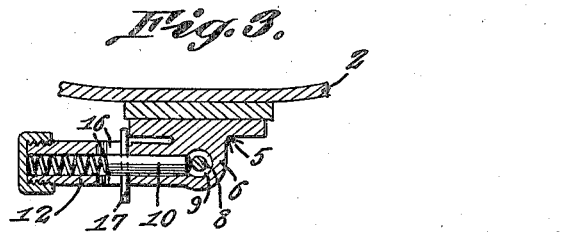
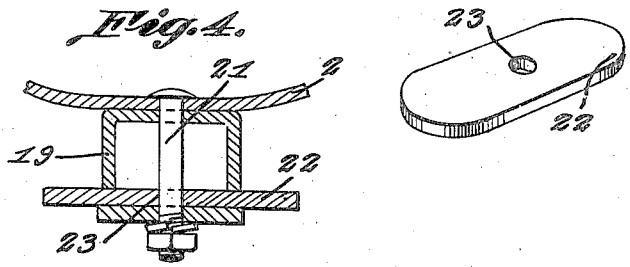
Alfred E. Morris, INVENTOR
BY Victor J. Evans & Co.
WITNESS  ATTORNEY Patented Apr. 7, 1936

2,036,953

UNITED STATES PATENT OFFICE 2,036,953

RELEASE MECHANISM

Alfred E. Morris, Morris, Ill.

Application May 21, 1935, Serial No. 22,667

1 Claim. (Cl. 280—150)

This invention relates to a release mechanism for a trip rope employed to control farm implements drawn by a tractor, and has for the primary object the provision of a device of this character which may be easily installed to a tractor seat and is so constructed as to permit quick connection of the trip rope to the tractor seat, locating the trip rope in convenient reach of the operator and which will release said rope when the latter receives a pull due to the farming implement becoming detached from the tractor or some other cause which might have a tendency to break the trip rope.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a release mechanism installed to a tractor seat and constructed in accordance with my invention.

Figure 2 is a fragmentary horizontal sectional view illustrating the same.

Figure 3 is a transverse sectional view taken on the line 3—3 of Figure 2.

Figure 4 is a detail sectional view illustrating the mounting of my invention to a seat standard of channel construction.

Figure 5 is a perspective view illustrating an attaching plate employed in connection with the type of seat standard shown in Figure 4.

Referring in detail to the drawing, the numeral 1 indicates a seat standard employed upon a tractor and having secured thereto a seat 2 by a bolt 3. The character 4 indicates a trip rope employed to control the farm implement drawn by the tractor and to provide a releasable connection between the seat standard 1 and the trip rope my invention is employed and is indicated generally by the character 5. Trip ropes are either manually held by the operator occupying the seat 2 or connected to the seat or its standard by complicated devices both expensive to manufacture and install on a tractor. It is essential that the trip rope be releasably secured to the tractor or manually held and when manually held requires the use of a person's hand, rendering it difficult to handle or manipulate the tractor. Farm implements drawn by a tractor are connected to such tractor in such a way that should the implement strike an obstruction or place an excessive load on the tractor, the implement will be automatically released from the tractor, consequently requiring that the trip rope be released at the same time. My invention is capable of economical manufacture and installation and will release the trip rope when the latter is subjected to a severe pull and when connecting the trip rope to the tractor will place said trip rope within convenient reach of the operator.

The present invention consists of a housing 6 having a bore 7 to receive a pin 8 provided adjacent one end with a groove 9 to be engaged by a spring-pressed latch member 10 slidably mounted in an offset tubular portion 12 forming an integral part of the housing 6. Pivoted to the pin 8 is a clevis or similar connecting element 13 to which the trip rope is secured. The housing 6 forms a part of an attaching plate 14, and the latter is apertured to receive bolt 3, thereby efficiently connecting my invention to the seat standard 1 in close proximity to the seat 2. To attach the trip rope to the seat standard, it is only necessary to shove the pin 8 into the housing until the latch member 10 engages the groove 9. The latch member engaging in the groove of the pin 8 will maintain the trip rope connected to the tractor standard for normal operation. However, should the trip rope receive an excessive pull or jerk, the pin 8 will free itself from the latch member 10. The offset 12 has oppositely arranged slots 16 through which extends a pin 17 carried by the latch member 10 for limiting the sliding movement thereof.

In some instances seat standards are of channel formation, as shown at 19, with the seat 2 secured thereto by a bolt 21. To adapt the plate 14 to the standard 19 an auxiliary plate 22 is provided, the latter having an opening 23 to receive the bolt 21. The auxiliary plate overlies the channel of the standard 19 and forms a bearing surface for the attaching plate 14 to engage, the latter receiving the bolt 21. The attaching plate 14 is capable of pivotal movement which will permit the trip rope to be actuated from either side of the seat 2 by the operator.

Having described the invention, I claim:

A release mechanism comprising a housing having a bore, a spring-pressed slidable latch member carried by said housing and entering the bore and arranged at right angles to the latter, a pin having a groove and a tapered end insertable in the bore to permit the latch member to ride past said end and engage the groove for releasably securing the pin to the housing, a connecting element pivoted to the pin and having a trip rope secured thereto, a plate formed on said housing and projecting beyond the latter and apertured to receive a seat securing bolt of a tractor.

ALFRED E. MORRIS.